Jan. 25, 1944.       J. I. HAASE            2,340,267
APPARATUS FOR SUPPLYING WEB MATERIAL
Filed March 28, 1942        5 Sheets-Sheet 1

Inventor
Jorgen I. Haase
By
Attorney

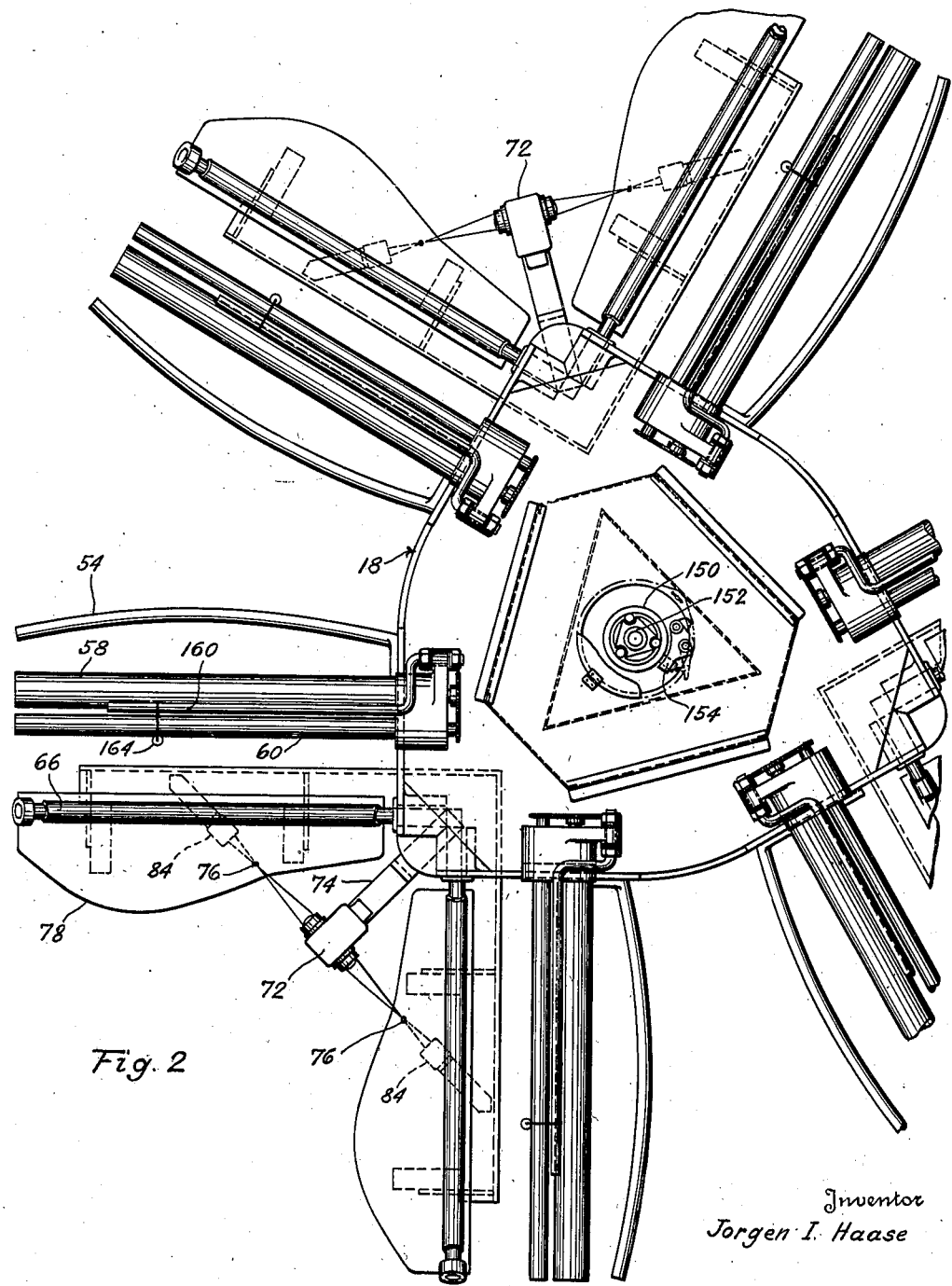

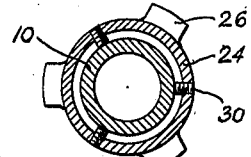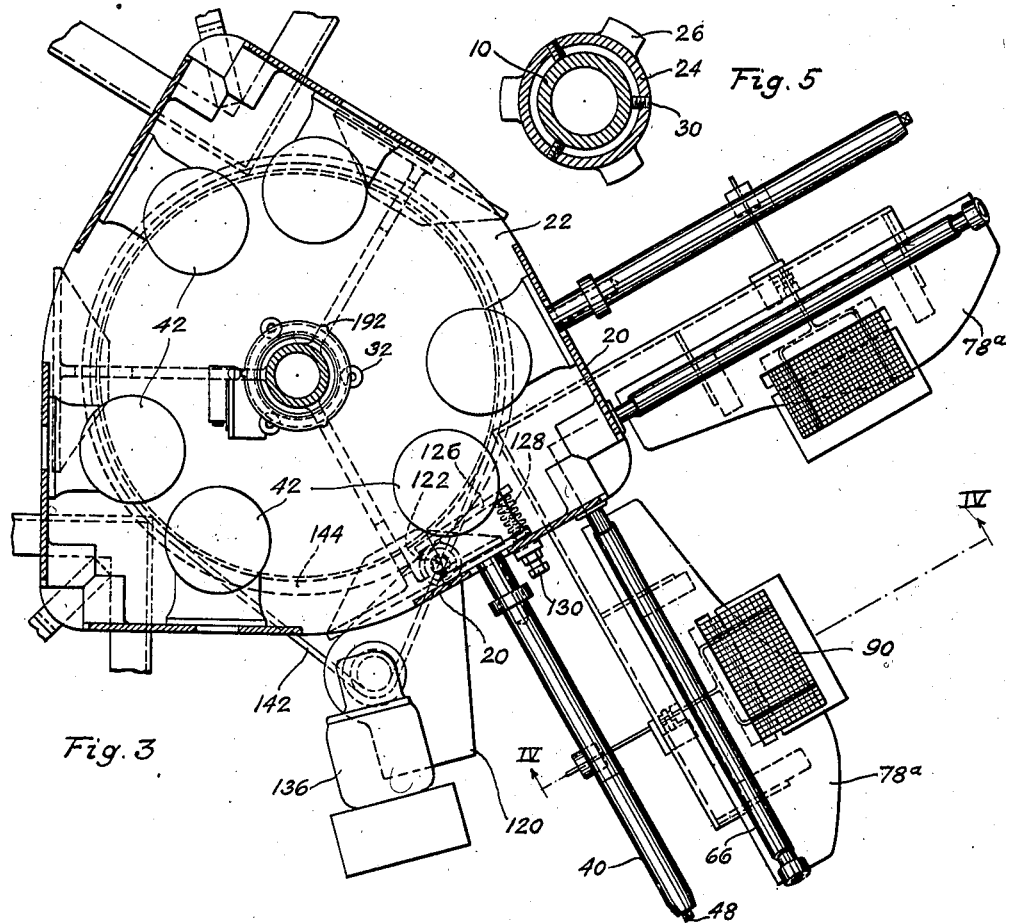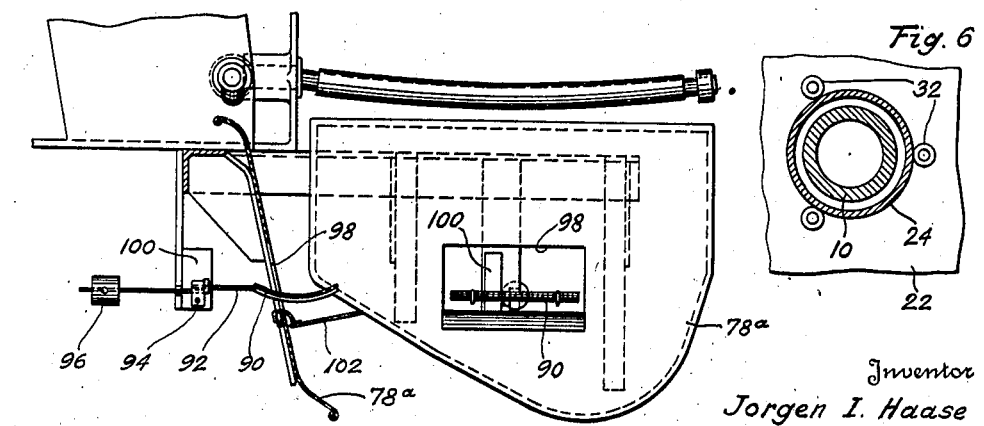

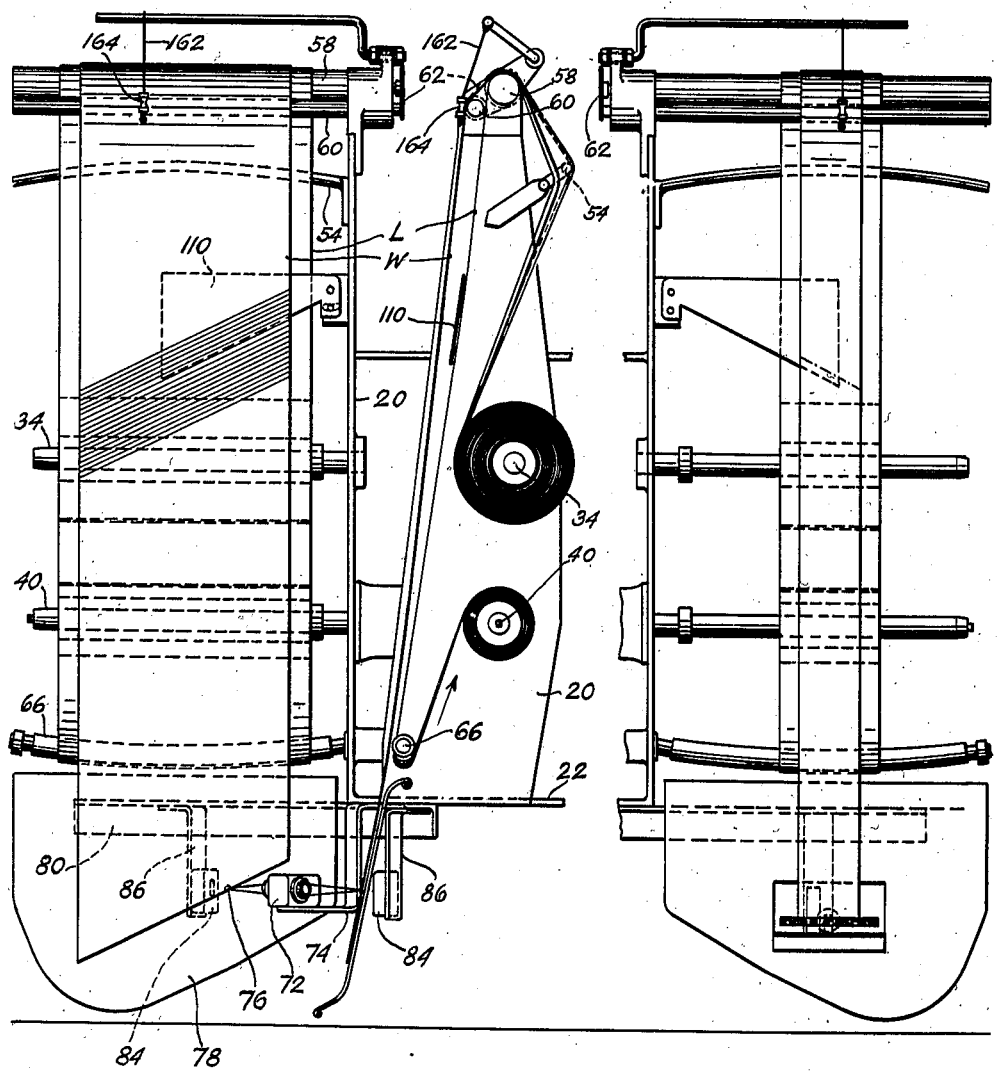

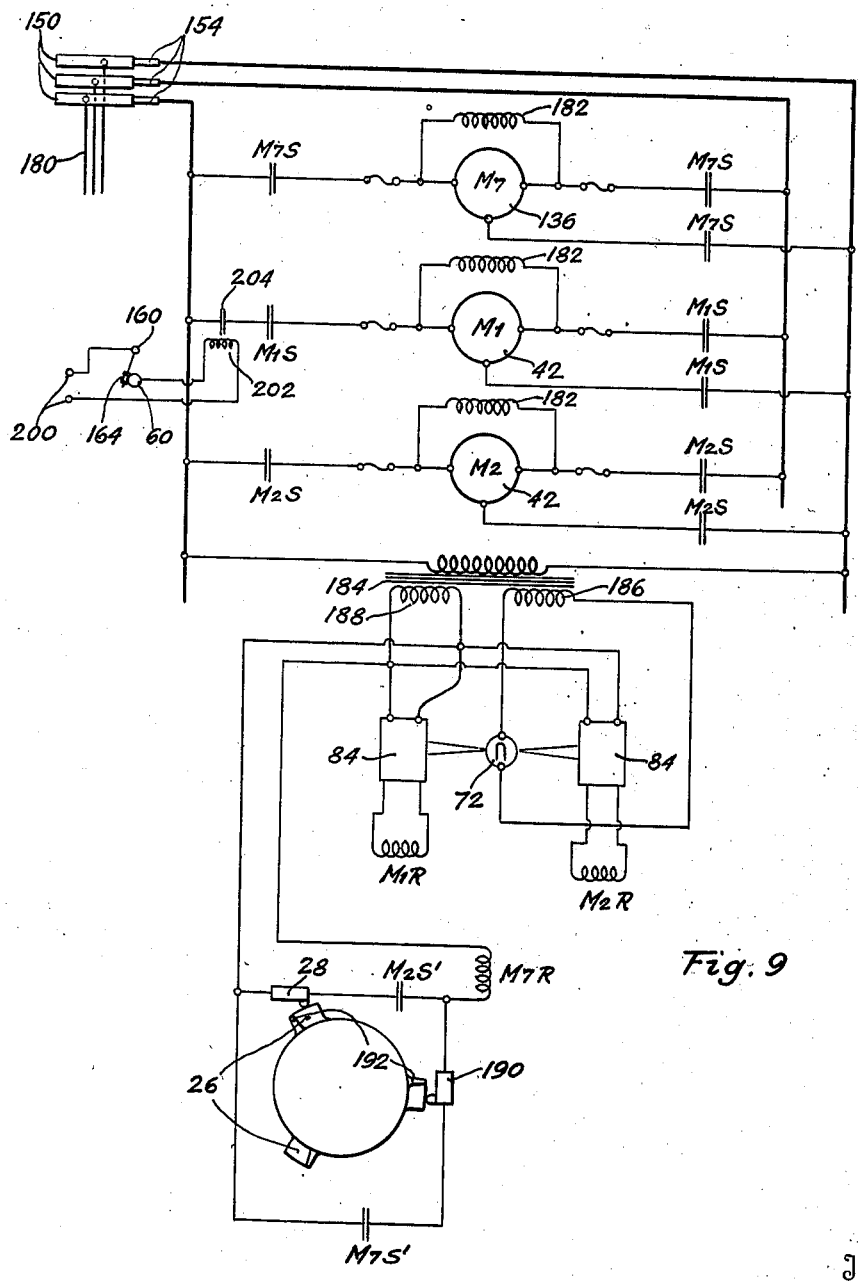

Patented Jan. 25, 1944

2,340,267

UNITED STATES PATENT OFFICE 2,340,267

APPARATUS FOR SUPPLYING WEB MATERIAL

Jorgen I. Haase, Akron, Ohio, assignor to Wingfoot Corporation, Akron, Ohio, a corporation of Delaware Application March 28, 1942, Serial No. 436,587

20 Claims. (Cl. 242—55)

This invention relates to apparatus for supplying web material, and, more particularly, is concerned with an automatic service turret for supplying and positioning adjacent a tire building apparatus the various materials to be built into a pneumatic tire.

Heretofore, it has been the usual practice to construct a pneumatic tire upon a building drum or core by applying in turn to the building drum the various plies of rubberized fabric, the chafer and breaker strips and finally the tread and side wall. The lengths of rubberized fabric for the building operation are usually carried in liner books which comprise a plurality of fabric leaves or sheets secured along one edge to a backing board. The rubberized fabric plies are cut on a bias-cutter and are positioned between the various leaves of the liner book from which the rubberized fabric plies can be removed as needed by the tire builder. This is a relatively cumbersome and inefficient manner of handling rubberized fabric plies, and some efforts have been made to supply rubberized fabric, chafer strips, breaker strips, and the like from rolled liners, but substantially all apparatus of this character has been more complicated and time consuming to use than the well-known liner books with their attendant faults.

It is the general object of my invention to avoid and overcome the foregoing and other objections to and difficulties of known apparatus for supplying ply or other web material, for example, to or adjacent a tire building machine, and, more broadly, to provide web supplying apparatus of relatively simple, efficient, fully automatic, and easily handled and controlled character.

Another object of my invention is the provision of apparatus for supplying web material, and from a plurality of stations, and having associated automatic means for positioning the desired station or stations in turn adjacent the point of web removal.

Another object of my invention is to provide an automatic turret type apparatus for supplying tire building materials adjacent a tire building machine, and having automatic means for controlling the feeding of web material from a plurality of stations positioned about the turret, and automatic means for indexing the turret.

Another object of my invention is the provision of apparatus for supplying web material and including a plurality of web supplying stations and having associated means with each station whereby the station will not operate when the particular roll of web material carried thereon becomes exhausted.

The foregoing and other objects of my invention are achieved by the provision of web material supply apparatus including web material supporting means, means for feeding web material from the supporting means, automatic means for controlling the operation of the feeding means, and means controlled by the automatic means for bodily moving the web supporting means.

For a better understanding of my invention reference should be had to the accompanying drawings wherein Fig. 1 is a side elevation, partly broken away, of one embodiment of apparatus incorporating the principles of my invention;

Fig. 2 is a plan view of the apparatus of Fig. 1;

Fig. 3 is a horizontal sectional view taken on line III—III of Fig. 1 and illustrating specifically the counter-balanced switch type of feed control;

Fig. 4 is a vertical fragmentary cross-sectional view taken on line IV—IV of Fig. 3;

Fig. 5 is a horizontal cross-sectional view taken on line V—V of Fig. 1;

Fig. 6 is a horizontal cross-sectional view taken on line VI—VI of Fig. 1;

Fig. 7 is a side elevation, on reduced scale, and diagrammatically indicating the mounting and position of web material and a liner with the apparatus;

Figure 1:
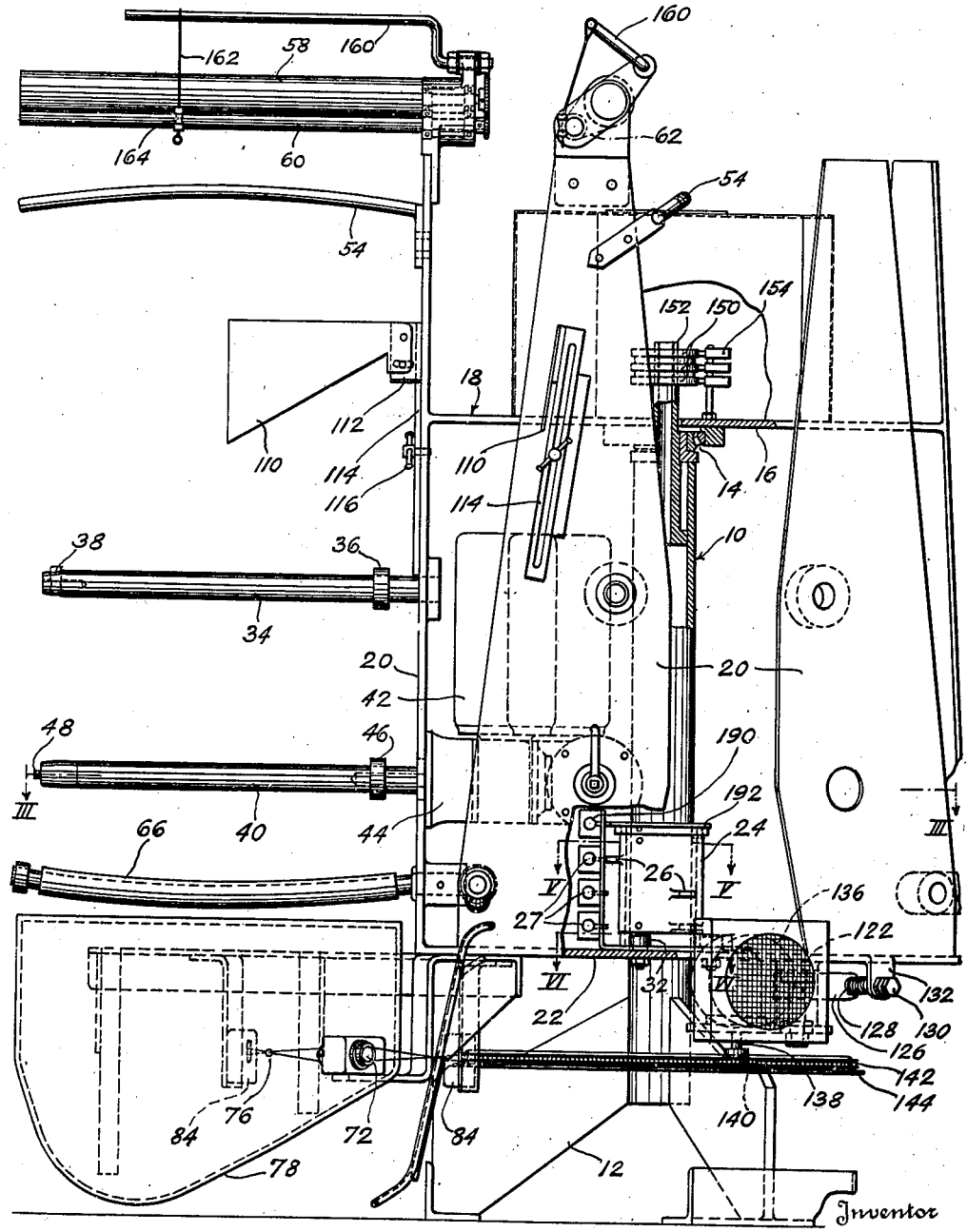

Fig. 8 is a view illustrating the handling of relatively narrow web material such as a breaker strip, on the apparatus and is similar to, but of opposite hand from the view of Fig. 7; and Fig. 9 is a schematic wiring diagram of the control means incorporated with the apparatus Although the principles of my invention are broadly applicable to the handling of the web material of various kinds and for a wide variety of uses, nevertheless, my invention is particularly applicable to the handling of web employed in the construction of a pneumatic tire, and, accordingly, has been so illustrated and will be so described.

In the drawings, the numeral 10 indicates a post or column carried in a vertical position by a suitable base 12. The post 10 has a combined radial and thrust bearing 14 carried adjacent its upper end and the bearing supports a flat table 16 forming a part of a rotatable turret, indicated as a whole by the numeral 18. The turret 18 includes a plurality of substantially vertically extending side plates 20 which are secured to the table 16 and also to a platform 22 which is horizontally positioned below the table and formed with a suitable central aperture to receive the post 10.

Secured to the post 10 immediately above the platform 22 is a hub 24 which carries a plurality of circumferentially and vertically spaced cams 26 each one of which engages in turn with an associated limit switch 27, as hereinafter more particularly described. The number of cams 26 is made equal to the number of stations incorporated with the turret, and in the embodiment of the invention illustrated there are three stations, so that there are three cams 26. The hub 24 is secured in any suitable way, as for example by screws 30 to the post 10, see Fig. 5, and a plurality of rollers 32, such as three, are mounted on the table 22 on vertical axes so as to engage in rolling relation with the outer periphery of the bottom of the hub 24, as best seen in Figs. 1 and 6.

As already noted, and as evident from Figs. 2 and 3, the turret 18 of the embodiment of the invention illustrated includes three stations. Each station includes a pair of web material supplying mechanisms and each complete mechanism is mounted upon a vertical plate 20, and the plates 20 of each station are positioned at, or substantially at, right angles to each other. Inasmuch as each web material supplying mechanism is identical to every other web material supplying mechanism, only one of such mechanisms will be particularly described.

Secured in cantilever relation on the plate 20, and in a vertically central part thereof is a shaft 34 which is adapted to rotatably receive and carry a roll of web material, such as the rubberized fabric ply adapted to be used in a tire building operation. The rubberized fabric web material is wound up in roll form with an interposed liner of suitably treated fabric so that the rubberized fabric web material sticks only lightly to the liner even though the roll of web material and liner is wound under considerable pressure and to reasonably large size. The shaft 34 is stationary and the roll of web material and liner ordinarily includes a wooden, cardboard or metal core which is freely rotatable upon the stationary shaft 34. The shaft 34 may include an abutment collar 36 and a spring positioned stop 38 which will hold the roll of liner and web material in proper rotary position on the shaft 34.

The numeral 40 indicates a shaft journalled in cantilever relation with the plate 20 and adapted to be driven by a motor 42 connected to the shaft 40 through suitable gear means 44. The shaft 40 is adapted to removably wind up a length of liner material, and may be provided with suitable spring positioned keys (not shown) for holding the roll of wound up liner material in position. An abutment collar 46 may be incorporated with the shaft 40, and the shaft 40 may be formed with a squared end 48 to permit the application of a hand crank, if this be desired. The shaft 40 winds up the liner from the shaft 34 after the liner has passed over the several means which will now be described.

As best evident from Fig. 7, the end of the liner and web material roll mounted on the shaft 34 extends over a stretcher bar 54 which is secured at one end to the plate 20. The stretcher bar 54 is curved from end to end, and the curve of the bar is positioned so that the liner engages with the bar as with the crown of a pulley so that the liner is stretched laterally and substantially all wrinkles are removed therefrom.

From the stretcher bar 54 the web material and liner pass together to and over a roller 58 rotatably journalled in a cantilever bearing at the top of the plate 20. A second and a smaller roller 60 is journalled in a cantilever bearing in front of the roller 58 and slightly below the roller 58, and the rollers 58 and 60 are connected together by a chain 62 which extends around suitable sprockets carried at the ends of the rollers 58 and 60 extending beyond the cantilever bearings therefor. The roller 60 has the web material, marked W, passing over the top, and the liner, marked L, passing to the back of and below the roller 60. Thus, the roller 60 serves to peel the web material W from the liner L.

The liner L after passing over the roller 58 and behind the roller 60 passes in a substantially vertical path down and around a roller 66 positioned adjacent the front bottom of the plate 20 and back and up to, and is wound on the shaft 40. The roller 66 is made segmental and is crowned like the bar 54 so as to give a lateral stretching action to the liner L and to properly align the liner with the wind up portion of the shaft 40.

The web material W after passing over the top and front of the roller 60, and now free of the liner L falls in a substantially vertical path down to a point adjacent and somewhat beyond the bottom of the plate 20.

Means are incorporated in the supplying mechanism just described for automatically stopping the feeding movement of the web material. One embodiment of such control means include a light source 72 mounted upon a suitable bracket 74 carried by the platform 22 and adapted to throw two beams of light in opposite direction and at an angle of approximately 45 degrees to the web material.

The light thrown from the light source 72 passes through a small hole 76 formed in an apron 78 of opaque material such as sheet metal, which apron has the shape of a horizontally flattened and vertically elongated letter S and which is positioned on a suitable arm 80 so that the end of the dangling web material W will slide down over the apron 78 and cover the opening 76. Mounted behind the opening 76 in the apron 78 is a photo-electric cell unit or assembly 84 which is carried on a bracket 86 secured to the arm 80. The photo-electric cell unit 84 controls the operation of the motor 42, all as hereinafter more fully explained.

The second manner of controlling the operation of the motor 42 by the amount of web material fed is illustrated specifically in Figs. 3 and 4 and provides a counterbalanced platform which is engaged by the end of the web material and tilted to operate a motor switch. Specifically, the numeral 90 indicates a horizontally positioned platform made of light material such as wire screen, and carried on an arm 92 pivoted at 94, and having an adjustable counterbalance 96. The platform 90 is positioned in a relatively large opening 98 formed in the apron 78a. A micro switch 100 is associated with each arm 92 and pivot point 94 so that when the end of downwardly fed web material strikes the platform 90 the platform is moved downwardly to throw the micro switch 100 and stop the operation of the motor 42, as particularly described hereinafter. A shelf 102 is preferably associated with the bottom side of the opening 98 in the apron 78a so as to prevent undesired downward movement of the platform 90.

Generally, the photo-electric cell unit 84 and associated apparatus is employed to control the feeding movement of relatively wide rubberized fabric tire plies, such as specifically illustrated in Fig. 7 of the drawings. The platform 90 and the associated apparatus is used to control the feeding movement of a relatively narrow band of web material, for example, the chafer or breaker strip to be incorporated in a pneumatic tire carcass, all as particularly illustrated in Fig. 8 of the drawings. This distinction is made because it is more difficult to cause a narrow band of web material to cover and uncover the small opening 76 of the apron 78 than it is to have the relatively narrow web material strike the relatively wide platform 90.

Associated with each one of the plurality of web material feeding mechanisms is a gauging or measuring means which in the embodiment of the invention illustrated takes the form of a triangular plate 110 adapted to be positioned substantially in the plane of the web material W and between the web material and the liner L. The bottom of the plate 110 is formed at an angle which is substantially the same as the angle of the cords in the rubberized fabric ply material of the web W. Thus, with the apparatus and web material in the position shown in Fig. 7, an exact length of tire building fabric is measured between the opening 76 in the apron 78 and the measuring plate 110, and it is an easy and rapid operation for the tire building operator to tear off the tire building ply adjacent the bottom angular edge of the measuring plate 110. It will be understood that the plate 110 does not ordinarily serve as an anvil against which the web material is cut or torn, although it can be so used, but in most operations with bias cut rubberized cord tire building fabric it is a simple operation to tear the fabric in a direction parallel to the heavy main warp cord of the fabric and the tearing operation tears only rubber and small light weft cords. In order to provide for desired lengths of tire building fabric the measuring plate 110 is adapted to be positioned in any desired vertical relation with the plate 20, and this may be achieved by mounting the measuring plate 110 upon a bracket 112 having a longitudinally slotted base portion 114 which is secured to the plate 20 by a handled screw 116 which extends through the slot of the base 114 and into a suitably tapped hole in the plate 20.

Suitable means are incorporated in the apparatus for indexing the turret 18 through a suitable horizontal arc, and typical means for achieving this purpose are illustrated particularly in Figs. 1 and 3 of the drawings. Specifically, a bracket 120 is carried in a horizontal position for movement about a vertical pivot 122 secured to the platform 22. The bracket 120 is normally swung outwardly of the platform 22 by securing an arm 126 to the bracket 120 which arm engages with a compression spring 128 carried by adjustable screw means 130 extending through a bracket 132 carried on the platform 22. An electric motor 136 is mounted on the bracket 120 and includes a vertically positioned shaft 138 carrying a sprocket 140 which engages with a chain 142. The chain 142 extends around a narrow drum surface 144 carried by the base 12. By suitably adjusting the screw 130 the tension in the chain 142 and its friction against the drum 144 may be controlled.

Electric current is supplied to the various motors incorporated with the apparatus by the use of slip rings 150 which are carried on an extension 152 of the post 10, and to which electric current may be fed up through the center of the stationary post. Pick-up contacts 154 having sliding engagement with the slip rings 150 are mounted upon the table 16 in the manner illustrated in Fig. 1.

I preferably incorporate with the apparatus some suitable means for preventing the operation of any one of the driving motors 42 in case the web material being fed by such motor becomes exhausted. These means may comprise an arm 160 which is secured in electrically insulated relation with the apparatus and on the cantilever bearing of the roller 58, and which carries a flexible electric cable 162 having a weighted electrical contact 164 carried on the lower end of the cable 162 with the contact 164 normally being spaced from the roller 60 by the web material W, as particularly illustrated in Fig. 7 of the drawings. However, when the web material becomes exhausted the weighted contact 164 moves down into electrical engagement with the roller 60 so as to prevent the operation of the motor 42, as hereinafter particularly described. This prevents the end of the liner L from being pulled completely off of the shaft 34 without the attention of the operator which sometimes causes the end of the liner to become tangled in the apparatus. After the web material is exhausted the tail end of the liner L is wound up on the shaft 40 by rotating the shaft with a crank on the squared end 48 of the shaft, or if desired, the operation can be controlled by a push button operation of the motor 42 under the direct attention and control of the operator.

The automatic control means for the apparatus are particularly and diagrammatically illustrated in Fig. 9. Electrical input wires 180, generally from a three-phase 440 volt A. C. supply line, are secured to the stationary slip rings 150 from which the electric current is passed to each one of the several motors 42 for driving the several wind-up shafts 40, all in the manner schematically illustrated in Fig. 9. It will be evident from an inspection of the schematic wiring diagram of Fig. 9 that only the motors marked M1 and M2 have been shown in the wiring diagram, but it will be understood that if six web material feeding mechanisms are incorporated in the apparatus that there will be six motors 42. However, the motors M3, M4, M5, and M6 are connected in the circuit in exactly the same way as motors M1 and M2, and, therefore, the schematic wiring diagram has not been complicated by the inclusion of motors M3 to M6. Electric current is also passed to the indexing motor 136 in the manner illustrated in the schematic wiring diagram, and for purposes of convenience this motor has been indicated in the schematic wiring diagram as M7.

Each one of the motors M1, M2, and M7 is of the type having a spring actuated brake which is normally set to brake the shaft of the motor except when electric current is being supplied to drive the motor. The means for releasing the braking of the spring brakes generally comprise an electric solenoid 182 which is shunted across two of the motor leads so that when electric current is applied to the motor the electric solenoid 182 is operated to move the brake shoe away from the motor shaft. A three-pole, single-throw switch is incorporated in the three-phase electrical leads to each one of motors M1, M2, and M7. Such switch means are indicated at M1S in the M1 motor circuit, at M2S in the M2 motor circuit, and at M7S in the M7 motor circuit.

Two of the three-phase electrical leads from the slip rings 150 are connected to the primary of a transformer 184 which has one secondary coil 186 which supplies low voltage, for example, 6 volts, to the light source 72. The transformer 184 is, also, provided with a secondary 188 which provides a larger voltage, for example, 110 volts, and with suitable amperage to operate relays M1R and M2R. It will be understood that M1R relay is adapted when energized to close M1S switches to thereby cause the operation of M1 motor. Also, M2R relay when energized is adapted to close M2S switches and cause the operation of M2 motor.

Positioned in the electrical leads extending from the transformer secondary 188 to M1R relay is the photo-electric cell unit 84 which is adapted to be struck by the light beams from the light source 72. The arrangement and construction of the photo-electric cell unit 84 is such that when the light beams from the light source 72 are cut off, for example, by the end of the web material W, the M1R relay will not be energized. However, once the web material W is removed by the operator the light beams from the light source 72 strike the photoelectric cell unit 84 to provide for the flow of a relatively small amount of electric current therein, which current serves to close a relay (not specifically shown) in the photo-electric cell unit, and the closing of the relay closes switch means (not specifically shown) so that the electric circuit from the transformer secondary 188 to the M1R relay is completed and the M1R relay is actuated to close the M1S switches and operate M1 motor to thereby feed additional web material W down until the end of the web material W cuts off the light rays to the photo-electric cell unit 84. In exactly the same way the photo-electric cell unit 84 positioned in the electrical leads from the secondary 188 to the M2R relay controls the operation of M2 motor.

In addition, the operation of the M2R relay also controls the indexing of the turret 18. This is achieved by extending the leads from the transformer secondary 188 to a M7R relay, which when actuated closes M7S switches to operate M7 motor and index the turret 18 to the next station. Electric current flows to the M7R relay through switch 27 and switch M2S'. The switch 27 is normally open and is held open by spring means, but is adapted to be closed by engagement with the cam 26 on the hub 24, as the switch and turret assembly rotate about the post 10. Switch M2S' is normally open, also, but is adapted to be closed by M2R relay at the same time that switches M2S are closed to operate the motor M2. Thus, when M2R relay is energized in the manner heretofore described to close M2S switches the M2S' switch is also closed to complete the electric circuit through switch 27 to M7R relay.

The energizing of M7R relay causes it to close M7S switches to thereby cause the flow of electric current to M7 motor and the beginning of the indexing movement of the turret 18.

However, as soon as the switch 27 passes beyond the influence of cam 26 the electric circuit to the M7R relay would be broken and the indexing movement would be stopped. A holding circuit of suitable character is provided to keep the M7R relay circuit closed until the indexing movement of the turret 18 is completed. One particular embodiment of such a holding circuit comprises a normally closed switch 190 and a switch M7S' connected in series and shunting the switches 27 and M2S'. Thus, when the M7R relay is energized in the manner last described the closing of the M7R relay not only closes the M7S switches, but, also, closes the M7S' switch to thereby provide a bridging or shunting circuit which will provide for the flow of electric current to the M7R relay even after the switch 27 passes the cam 26 to thereby permit the opening of the switch 27. The holding circuit including the normally closed switch 190 and the switch M7S' will cause the continued flow of current to the relay M7R until the turret 18 has moved to the next station. At this time a small cam 192 strikes and opens the switch 190 and thereby breaks the flow of electric current to the relay M7R. Accordingly, flow of electric current to the relay M7R is interrupted and the switches M7S and M7S' are opened to stop the operation of the M7 motor and the indexing of the turret 18.

The breaking of the flow of electric current to the M7R relay occurs at a time interval just prior to the closing of the switch 27 by the cam 26 so that the flow of electric current to the M7R relay is interrupted until the next indexing movement of the turret. It will be understood that the switches M2S and M2S' have in the meantime been opened by the de-energizing of the M2R relay when the end of the web material W covers up the light beams passing from the light source 72 to the photo-electric cell unit 84. Also, it will be understood that the coast of the turret 18 at the end of the indexing movement brings another switch 27 to a position to be closed by another cam 26. Therefore, the apparatus is in its original position so far as electric circuits are concerned and the indexing operation can be repeated by energizing the M2R relay by the removal of web material W, all as above described. However, the M2 web feeding mechanism has moved away from the operator who is removing the web material, and it will be recognized that the next indexing movement of the turret 18 is controlled by the removal of web material from M4 station, and thereafter from M6 station, which will again bring M2 station around to a position adjacent the operator.

Although Fig. 9 does not illustrate M3 to M6 motors, relays, and switches, which have been omitted for the sake of simplicity, nevertheless, it will be understood that a M4S' switch and a M6S' switch will be positioned in the electric circuit to the relay M7R so as to close this relay circuit in exactly the same manner as the circuit is closed by the M2S' switch.

If micro-switches 100 are employed instead of the photo-electric cell units 84 to control the operation of the M5R and M6R relays the basic schematic wiring diagram of Fig. 9 is in no way altered.

Further, having reference to Fig. 9, it should be noted that the safety stopping mechanism, including the bar 160, flexible electric cable 162, and weight contact 164, are connected in an electric circuit with a source of current supply 200 and a relay 202. When the contact 164 engages with the roller 60 the relay 202 is energized to open normally closed contacts 204 positioned at one or more places in the motor circuit. The safety stopping means just described has been illustrated only in conjunction with M1 motor, but it will be appreciated that similar safety means are incorporated with each one of the motors M1 to M6.

It is believed that the operation of my improved apparatus will be understood from the foregoing detailed description. Suffice it to say here that web material will be automatically fed in proper length at each one of the several stations, and after being removed by the operator the apparatus will be automatically indexed to bring additional web material adjacent the operator. In the meantime, the web material removed from the first station has been automatically replaced by a new length of automatically measured web material. The entire operation can be continuously repeated indefinitely, necessitating only periodic replenishment of the web material on the supply rolls and the removal of the rolled-up liners.

From the foregoing, it will be recognized that the various objects of my invention have been achieved by the provision of a relatively simple, easily operated, substantially fool-proof apparatus for feeding a plurality of lengths of web material in turn to a removing station, and particularly, for feeding the various web materials employed in the construction of a pneumatic tire to a position adjacent the tire building operator, and in a manner so that the materials can be readily removed one by one by the operator in proper length and with a minimum of attention and effort so that the tire building operation is greatly speeded up and facilitated.

While in accordance with the patent statutes I have specifically illustrated and described one embodiment of my invention, it should be particularly understood that I am not to be limited thereto or thereby, but that the scope of my invention is defined in the appended claims.

I claim:

1. An automatic service turret for supplying web materials adjacent a tire building machine, or the like, and comprising a base, a turret rotatably supported on the base, a plurality of web material supplying stations carried by the turret, each station including let-off means for a roll of web material and liner, wind-up means for the liner, a plurality of means interposed between the let-off means and the wind-up means for laterally spreading the liner, said web material and liner being carried at least in part in a substantially vertical plane between the let-off means and wind-up means, roller means for separating the web material and liner adjacent the top of the substantially vertical plane, means for automatically stopping the wind-up means when a desired length of web material is separated from the liner, adjustable gauge means for measuring a portion of the length of web material removed from the liner, means for automatically starting the wind-up means when the measured portion of web material is removed from the remainder of the web material, and means for automatically indexing the turret from one station to the next after web material is removed from the first station.

2. An automatic service turret for supplying web materials adjacent a tire building machine, or the like, and comprising a base, a turret rotatably supported on the base, a plurality of web material supplying stations carried by the turret, each station including let-off means for a roll of web material and liner, wind-up means for the liner, a plurality of means interposed between the let-off means and the wind-up means for laterally spreading the liner, said web material and liner being carried at least in part in a substantially vertical plane between the let-off means and wind-up means, roller means for separating the web material and liner adjacent the top of the substantially vertical plane, means for automatically stopping the wind-up means when a desired length of web material is separated from the liner, adjustable gauge means for measuring a portion of the length of web material removed from the liner, and means for automatically starting the wind-up means when the measured portion of web material is removed from the remainder of the web material.

3. An automatic service turret for supplying web materials adjacent a tire building machine, or the like, and comprising a base, a turret rotatably supported on the base, a plurality of web material supplying stations carried by the turret, each station including let-off means for a roll of web material and liner, wind-up means for the liner, a plurality of means interposed between the let-off means and the wind-up means for laterally spreading the liner, said web material and liner being carried at least in part in a substantially vertical plane between the let-off means and wind-up means, roller means for separating the web material and liner adjacent the top of the substantially vertical plane, means for automatically stopping the wind-up means when a desired length of web material is separated from the liner, adjustable gauge means for measuring a portion of the length of web material removed from the liner, and means for automatically indexing the turret from one station to the next after web material is removed from the first station.

4. Apparatus for supplying building materials adjacent a tire building machine, or the like, and comprising a base, a turret rotatably supported on the base, a plurality of web material supplying stations carried by the turret, each station including let-off means for a roll of web material and liner, said web material and liner being carried at least in part in a substantially vertical plane between the let-off means and wind-up means, roller means for separating the web material and liner adjacent the top of the substantially vertical plane, means for automatically stopping the wind-up means when a desired length of web material is separated from the liner, adjustable gauge means for measuring a portion of the length of web material removed from the liner, means for starting the wind-up means when a portion of web material is removed from the end of the length of web material, and means for automatically indexing the turret from one station to the next after web material is removed from the first station.

5. Apparatus for supplying building materials adjacent a tire building machine, or the like, and comprising a base, a turret rotatably supported on the base, a plurality of web material supplying stations carried by the turret, each station including let-off means for a roll of web material and liner, wind-up means for the liner, said web material and liner being carried at least in part in a substantially vertical plane between the let-off means and wind-up means, roller means for separating the web material and liner adjacent the top of the substantially vertical plane, means for automatically stopping the wind-up means when a desired length of web material is separated from the liner, adjustable gauge means for measuring a portion of the length of web material removed from the liner, and means for indexing the turret from one station to the next after web material is removed from the first station.

6. An automatic service turret for supplying web materials, and comprising a base, a turret rotatably supported on the base, a plurality of web material supplying stations carried by the turret, each station including let-off means for a roll of web material and liner, wind-up means for the liner, said web material and liner being carried at least in part in a substantially vertical plane between the let-off means and wind-up means, means for separating the web material and liner adjacent the top of the substantially vertical plane, means for automatically stopping the wind-up means when a desired length of web material is separated from the liner, means for starting the wind-up means when a portion of web material is removed from the end of the length of web material, and means for indexing the turret from one station to the next after web material is removed from the first station.

7. An automatic service turret for supplying web materials, and comprising a base, a turret rotatably supported on the base, a plurality of web material supplying stations carried by the turret, each station including let-off means for a roll of web material and liner, wind-up means for the liner, said web material and liner being carried at least in part in a substantially vertical plane between the let-off means and wind-up means, means for separating the web material and liner adjacent the top of the substantially vertical plane, means for automatically stopping the wind-up means when a desired length of web material is separated from the liner, and means for automatically indexing the turret from one station to the next after web material is removed from the first station.

8. An automatic service turret for supplying materials adjacent a tire building machine, or the like, and comprising a base, a turret rotatably supported on the base, a plurality of web material supplying stations carried by the turret, each station including let-off means for a roll of web material and liner, wind-up means for the liner, means for separating the web material and liner, means for automatically stopping the wind-up means when a desired length of web material is separated from the liner, means for automatically starting the wind-up means when certain of the web material is removed, and means for automatically indexing the turret from one station to the next after web material is removed from the first station.

9. Apparatus for supplying web materials and comprising a base, a turret rotatably supported on the base, a plurality of web material supplying stations carried by the turret, each station including let-off means for a roll of web material and liner, wind-up means for the liner, means for separating the web material and liner, means for automatically stopping the wind-up means when a desired length of web material is separated from the liner, and means for automatically starting the wind-up means when certain of the web material is removed.

10. Apparatus for supplying web materials and including let-off means for a roll of web material and liner, wind-up means for the liner, means for separating the web material and liner, means for automatically stopping the wind-up means when a desired length of web material is separated from the liner, and means for automatically starting the wind-up means when certain of the web material is removed.

11. Apparatus for supplying web materials, and comprising a base, a turret rotatably supported on the base, a plurality of web material supplying stations carried by the turret, each station including let-off means for a roll of web material and liner, wind-up means for the liner, a plurality of means interposed between the let-off means and the wind-up means for laterally spreading the liner, said web material and liner being carried at least in part in a substantially vertical plane between the let-off means and wind-up means, roller means for separating the web material and liner adjacent the top of the substantially vertical plane, means for automatically stopping the wind-up means when a desired length of web material is separated from the liner, and adjustable gauge means for measuring a portion of the length of web material removed from the liner.

12. An automatic service turret for supplying web materials and comprising a base, a turret rotatably supported on the base, a plurality of web material supplying stations carried by the turret, each station including let-off means for a roll of web material and liner, wind-up means for the liner, a plurality of means interposed between the let-off means and the wind-up means for laterally spreading the liner, said web material and liner being carried at least in part in a substantially vertical plane between the let-off means and wind-up means, roller means for separating the web material and liner adjacent the top of the substantially vertical plane, and means for automatically stopping the wind-up means when a desired length of web material is separated from the liner.

13. Apparatus for supplying web material comprising a rotatable member, a plurality of web material supply stations carried by the rotatable member, each supply station including a support for a roll of web material, means for automatically advancing the web material when a length thereof has been removed, means for automatically stopping the advancing web material when the original length of web material has been restored, means for automatically stopping the operation of the web advancing means when the web material is used up, said stations forming a plurality of pairs, the stations of each pair facing at least partially towards each other, and means associated with a station of each pair for automatically indexing the rotatable member when the web material is removed from said last-named station.

14. Apparatus for supplying web material comprising a member, a plurality of web material supply stations carried by the member, each supply station including a support for a roll of web material, means for automatically advancing the web material when a length thereof has been removed, means for automatically stopping the advancing web material when the original length of web material has been restored, means for automatically stopping the operation of the web advancing means when the web material is used up, and means associated with a station for automatically moving the member to present a second station when the web material is removed from said first station.

15. Apparatus for supplying web material comprising a member, a plurality of web material supply stations carried by the member, each supply station including a support for a roll of web material, means for automatically advancing the web material when a length thereof has been removed, means for automatically stopping the advancing web material when the original length of web material has been restored, and means for automatically stopping the operation of the web advancing means when the web material is used up.

16. Apparatus for supplying material comprising a movable member, a plurality of material supply stations carried by the movable member, each supply station including a support for material, means for automatically advancing the material when a length thereof has been removed, means for automatically stopping the advancing material when the original length of material has been restored, means for automatically stopping the operation of the web advancing means when the material is used up, and means for automatically moving the member to present the stations in turn.

17. Apparatus for supplying material comprising a movable member, a plurality of material supply stations carried by the movable member, each supply station including a support for material, means for automatically advancing the material when a length thereof has been removed, means for automatically stopping the advancing material when the original length of material has been restored, and means for automatically moving the member to present the stations in turn.

18. Apparatus for supplying web material comprising a movable member, a plurality of web material supply stations carried by the movable member, each supply station including a support for web material, means for automatically advancing the web material when a length thereof has been removed, means for automatically stopping the advancing web material when the original length of web material has been restored, and means associated with a station for automatically indexing the movable member when the web material is removed from said station.

19. Apparatus for supplying material comprising a rotatable member, a plurality of material supply stations carried by the rotatable member, each supply station including a support for a roll of material, means for automatically advancing the material when a length thereof has been removed, means for automatically stopping the advancing material when the original length of material has been restored, and means for automatically indexing the rotatable member.

20. Web material supply apparatus including web material supporting means, means for feeding web material from the supporting means, photo-electric cell means for controlling the operation of the feeding means, and means controlled by the photo cell means for bodily moving the web supporting means.

JORGEN I. HAASE.